April 23, 1957     E. R. LANGTRY ET AL     2,789,621
VEHICLE SEAT LATCH MECHANISM Filed Nov. 2, 1955     2 Sheets-Sheet 1

E.R. LANGTRY
W.L. DONEY
INVENTORS

April 23, 1957  E. R. LANGTRY ET AL  2,789,621
VEHICLE SEAT LATCH MECHANISM

Filed Nov. 2, 1955  2 Sheets-Sheet 2

E. R. LANGTRY
W. L. DONEY
INVENTORS

BY E.C. McRae,
J.R. Faulkner,
J.H. Oster.
ATTYS.

United States Patent Office 2,789,621
Patented Apr. 23, 1957

2,789,621

VEHICLE SEAT LATCH MECHANISM

Edwin R. Langtry, Northville, and Wilbert L. Doney, Detroit, Mich., assignors to Ford Motor Company, Dearborn, Mich., a corporation of Delaware Application November 2, 1955, Serial No. 544,563

3 Claims. (Cl. 155—5)

This invention relates generally to motor vehicle seats.

An object of the present invention is to provide latch mechanism for a motor vehicle seat cushion adapted to retain the cushion in a fixed location within the vehicle body at all times so that it cannot inadvertently become dislodged during an accident or during rapid vehicle deceleration.

A further object of the invention is to provide latch mechanism for a motor vehicle seat of the type mentioned above which is so designed as to permit the seat cushion to be readily assembled within the vehicle body in its proper position and easily latched in place. The mechanism assists in properly locating the seat within the body, and also permits the seat cushion to be readily unlatched and removed for maintenance or other purposes.

Other objects and advantages of this invention will be made more apparent as this description proceeds, particularly when considered in connection with the accompanying drawings, wherein.

Figure 1:
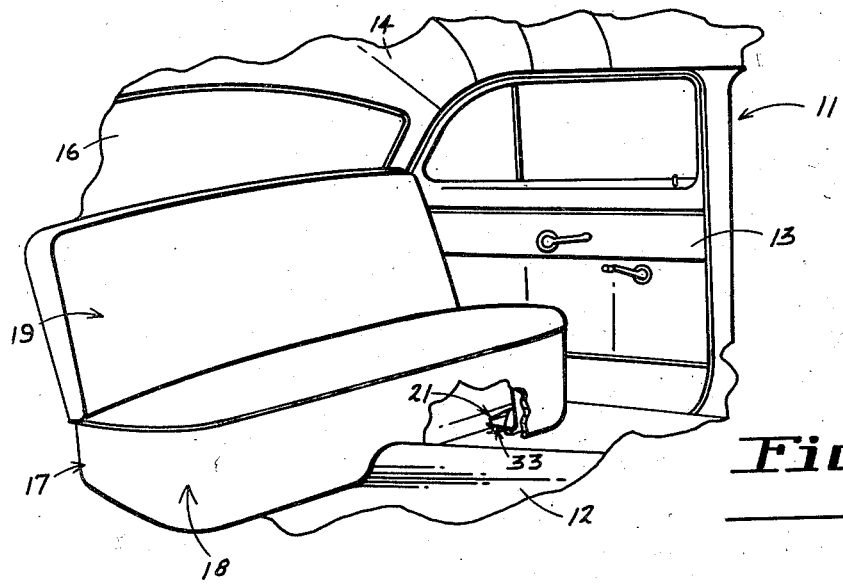
Figure 1 is a fragmentary perspective view of the interior of a motor vehicle body incorporating the present invention.

Referring now to the drawings, and particularly to Figure 1, the reference character 11 indicates generally a motor vehicle body having a floor panel 12, a rear door 13, a roof 14, and a rear window 16. A rear seat 17 is conventionally positioned within the vehicle body 11, and comprises a seat cushion 18 and a seat back 19. The seat cushion 18 rests directly upon the floor panel 12, and its rearward edge is wedged beneath the lower edge of the seat back 19, the latter being rigidly secured to the body structure of the vehicle.

During rapid deceleration, as for example during an accident, the momentum of the relatively heavy seat cushion of the rear seat of a motor vehicle is subject to strong forces tending to move it forwardly and often upwardly. The present construction incorporates latch mechanism anchoring the seat cushion to the floor panel in such manner as to prevent its movement under such circumstances, while at the same time permitting the seat cushion to be readily attached and detached for assembly and maintenance purposes.

A latch bracket 21 comprising an inverted generally U-shaped stamping is formed with marginal flanges 22 and 23 rigidly attached to the floor panel 12 by means of rivets 24. The rear leg of the bracket 21 has a generally vertical lower portion 26 extending upwardly at right angles to the mounting flange 22 and continuing into a rearwardly and upwardly inclined upper portion 27. Similarly, the front leg of the bracket 21 has a lower vertical portion 28 and an integral forwardly and upwardly inclined upper portion 29.

The front leg 28—29 of the latch bracket is higher than the rear leg 26—27 of the bracket so that the interconnecting upper portion 31 of the bracket is inclined upwardly in a forward direction. It will also be noted that since the upper portions 27 and 29 of the bracket legs diverge in an upward direction, the upper portion 31 of the bracket forms an elongated inclined ramp facilitating the assembly of the seat cushion within the vehicle body.

The seat cushion 18 has an angle shaped marginal frame member 32 at the lower marginal edge of the seat cushion, forming a portion of the frame structure thereof. A relatively heavy wire latch member 33 is attached to the frame of the seat cushion 18 and has a generally U-shaped portion extending rearwardly from the frame member 32. This U-shaped portion has side legs 34 and 36 and an interconnecting end portion 37. The legs 34 and 36 rest upon the lower flange 38 of the frame member 32 and are suitably spot welded thereto. Integrally formed with the U-shaped portion of the latch member 33 is an upwardly extending leg portion 39 suitably secured at its upper end to the upper frame member (not shown) of the seat cushion to provide additional support and stability for the latch member 33.

A latch member 33 and a floor bracket 21 are provided at each side of the seat cushion 18, but only one of the units is shown in the drawings for the sake of simplicity.

Figure 2:
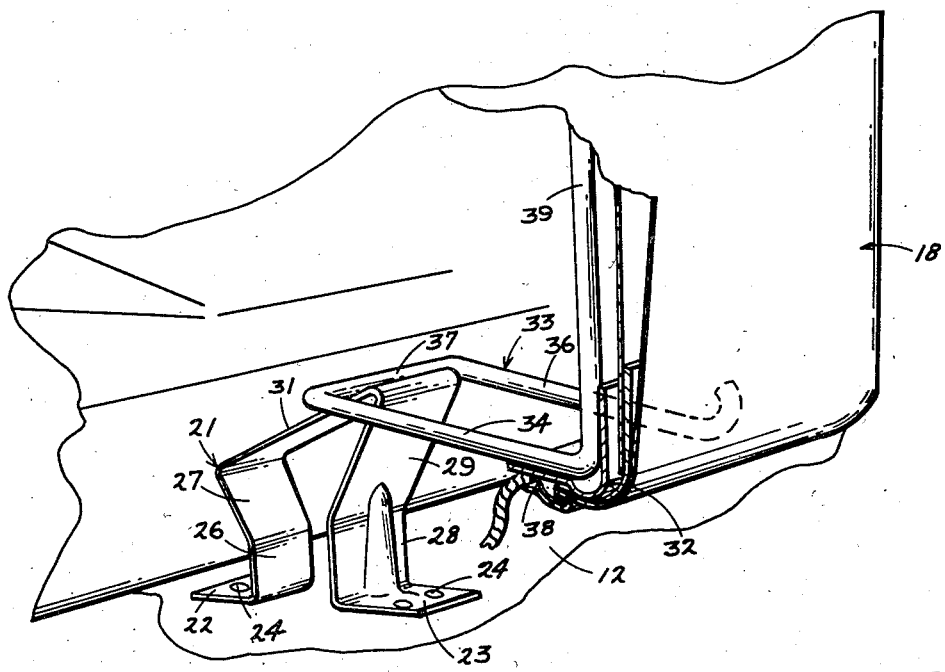
Figure 2 is an enlarged perspective view of a portion of the structure shown in Figure 1, with the parts thereof shown in an intermediate position during the mounting of the seat cushion within the vehicle body.
Figure 3:
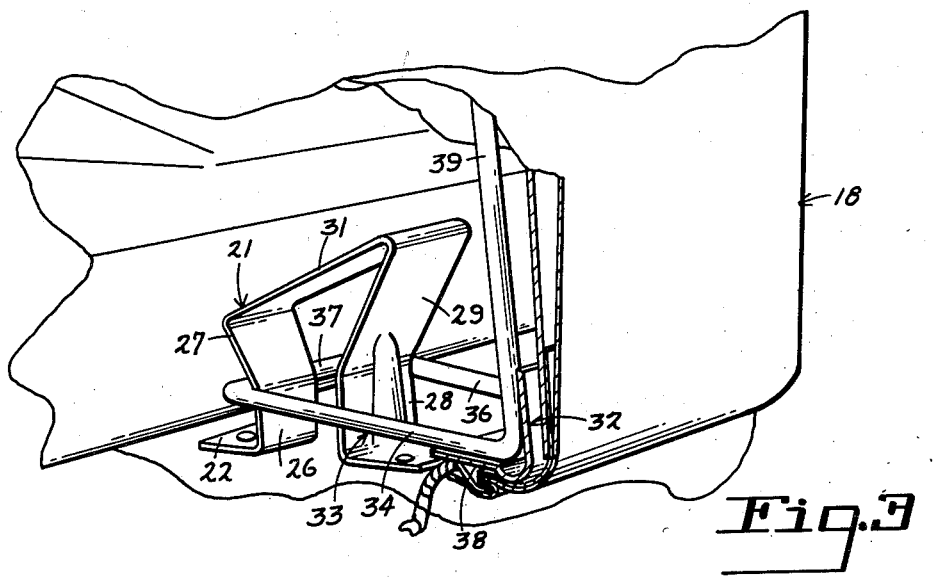
Figure 3 is a perspective view similar to Figure 2, but showing the parts in the fully assembled and latched position.
Figure 4:
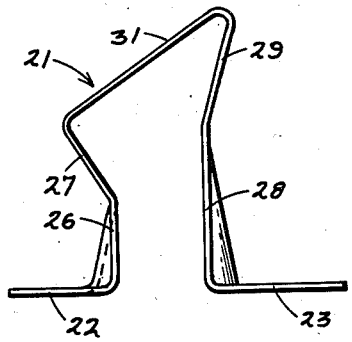
Figure 4 is a side elevational view of the latch bracket.

Figure 2 illustrates the seat cushion and the floor bracket during the mounting of the seat cushion within the vehicle body. During this operation, the rearward edge of the seat cushion 18 is first wedged beneath the lower edge of the seat back 19, with the forward portion of the seat being raised above floor. At this time, the end portion 37 of the wire latch member 33 rests upon the elongated inclined upper ramp 31 of the floor bracket 21 near the forward edge of the latter. Manual application of downward and rearward pressure upon the forward portion of the seat cushion 18 causes the end portion 37 of the latch member 33 to slide down the inclined ramp 31 and finally reach the latched portion shown in Figure 3, in which the U-shaped wire latch member 33 embraces the lower vertical portions 26 and 28 of the legs of the floor bracket with the end portion 27 of the latch member engaging the rear leg of the bracket. It will be noted that the rearwardly and upwardly inclined upper portion 27 of the rear leg of the floor bracket 21 acts to restrain upward movement of the latch member and accordingly the seat cushion so that it cannot inadvertently become disengaged therefrom during vehicle deceleration or during an accident.

Disengagement of the latch mechanism to enable the rear seat cushion to be removed for maintenance or other purposes is readily accomplished by first applying rearward pressure upon the lower forward portion of the seat cushion and subsequently lifting the forward portion of the seat cushion upwardly to disengage the latch member 33 from the floor bracket 21.

It will be understood that the invention is not to be limited to the exact construction shown and described, but that various changes and modifications may be made without departing from the spirit and scope of the invention, as defined in the appended claims.

What is claimed is:

1. In a motor vehicle body having a floor panel and a rear seat cushion positioned above said floor panel, a bracket mounted upon said floor panel and having front, rear and upper legs, a U-shaped latch member secured to said seat cushion and adapted to embrace said bracket and engage the rear leg of said bracket, said rear leg having a rearwardly and upwardly inclined retaining portion restraining inadvertent disengagement of said latch member from said floor bracket to hold said seat cushion against forward movement during vehicle deceleration.

2. The structure defined by claim 1 which is further characterized in that the rear leg of said bracket is shorter than the front leg thereof so that the upper leg of the bracket is inclined downwardly in a rearward direction to guide the latch member and facilitate the engagement of the latch member with the rear leg of the bracket.

3. The structure defined by claim 2 which is further characterized in that the front and rear legs of the bracket diverge away from each other in an upward direction so that the upper leg of the bracket will be elongated in a longitudinal direction to receive the latch member during the initial engagement of the latch member with the bracket to guide the latter into latching engagement with the bracket.

References Cited in the file of this patent
UNITED STATES PATENTS 1,865,175    Dinkel _____ June 28, 1932